J. F. DRAPER & J. J. TAGLAUER.
TRAP.
APPLICATION FILED OCT. 13, 1913.
1,108,724.
Patented Aug. 25, 1914.
2 SHEETS—SHEET 1.
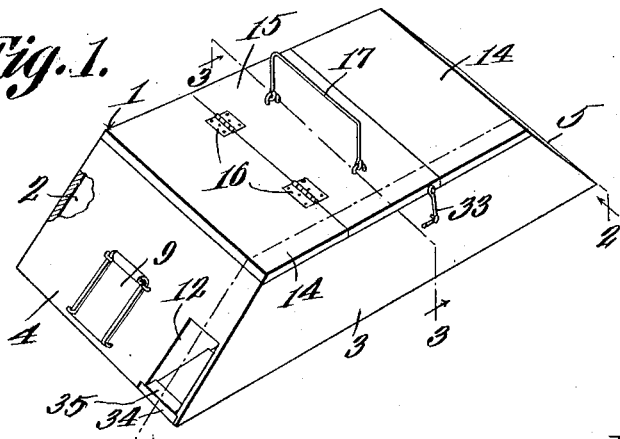
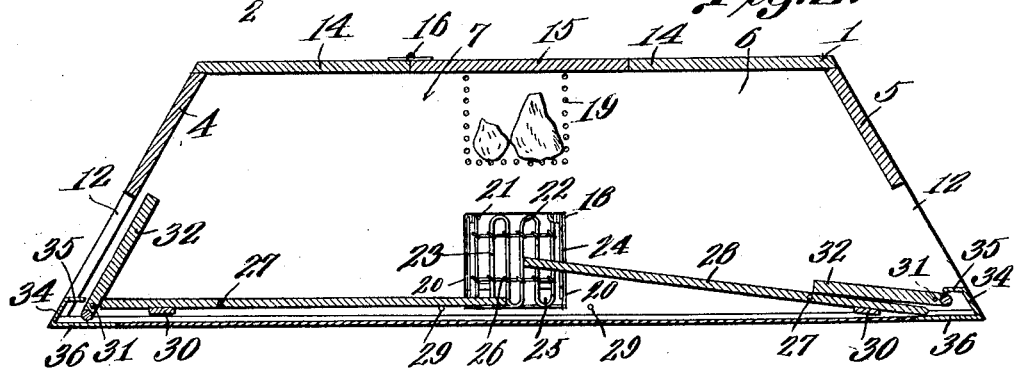
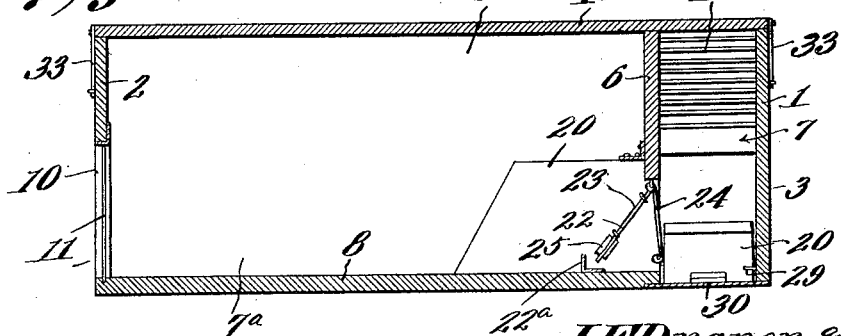
J. F. Draper and
John J. Taglauer,
Inventors
Witnesses
by C. A. Snow & Co.
Attorneys J. F. DRAPER & J. J. TAGLAUER.
TRAP.
APPLICATION FILED OCT. 13, 1913.
1,108,724.
Patented Aug. 25, 1914.
2 SHEETS—SHEET 2.
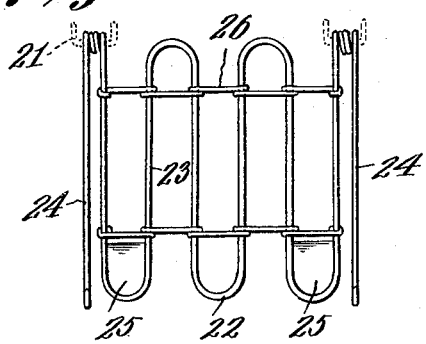
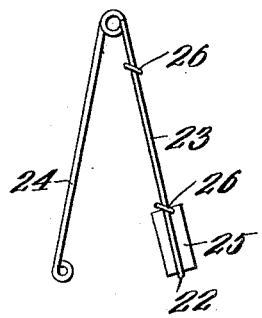
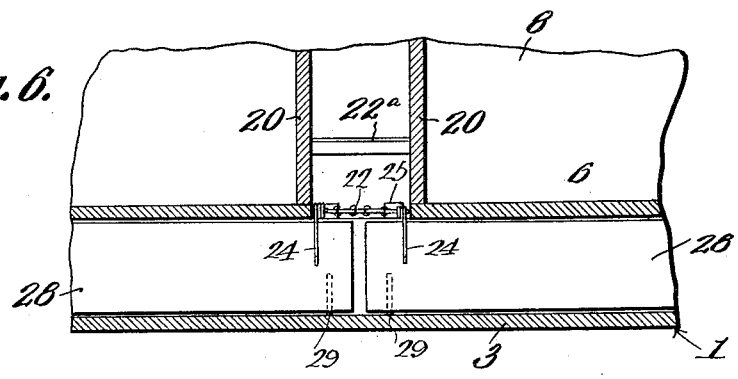
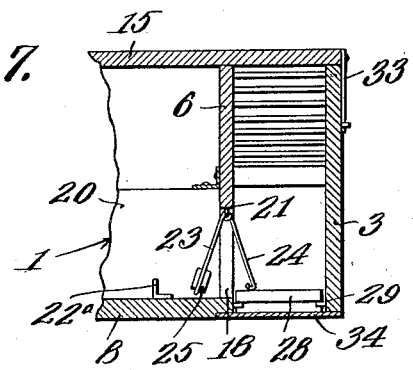
J. F. Draper and
John J. Taglauer,
Inventors
by C. A. Snow & Co.
Attorneys
Witnesses

UNITED STATES PATENT OFFICE.

JOHN FORNEY DRAPER AND JOHN JACOB TAGLAUER, OF EDDYVILLE, IOWA.

TRAP.

1,108,724. Specification of Letters Patent. Patented Aug. 25, 1914.

Application filed October 13, 1913. Serial No. 794,957.

*To all whom it may concern:*

Be it known that we, JOHN FORNEY DRAPER and JOHN J. TAGLAUER, citizens of the United States, residing at Eddyville, in the county of Wapello, State of Iowa, have invented a new and useful Trap, of which the following is a specification.

The device forming the subject matter of this application is a trap adapted primarily although not exclusively, to take rats, mice and the like, although, by varying the size of the structure, the same may be made useful for other purposes.

One object of the present invention is to provide novel means for controlling the barriers which regulate the ingress of an animal into the case and the egress of the animal therefrom.

Another object of the invention is to provide a trap of the sort above mentioned, in which the platforms which control the barriers are, in turn, held in closed position by a door which forms a part of the trap.

Another object of the invention is to provide a trap which may be positioned close to a vertical wall, thereby to receive animals moving along the vertical wall.

The invention aims to improve generally and to enhance the utility of, devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made without departing from the spirit of the invention.

In the accompanying drawing:—Figure 1 shows the invention in perspective, parts being broken away; Fig. 2 is a vertical longitudinal section; Fig. 3 is a vertical transverse section; Fig. 4 is a side elevation of the closure; Fig. 5 is an end elevation of the closure; Fig. 6 is a fragmental horizontal plan of the trap, the platforms being depressed; Fig. 7 is a cross sectional detail showing the platform depressed.

In carrying out the invention there is provided a case, denoted generally by the numeral 1, the same comprising side walls 2 and 3 and slanting end walls 4 and 5. Extended longitudinally of the case 1 is a partition 6 which is located relatively near to the side wall 3. The partition 6 serves to divide the interior of the case into a runway 7 and a compartment 7ª, as will be understood best from Fig. 3. The case includes a bottom 8 which extends from the side wall 2 to the partition 6, the runway 7 being open at the bottom saving as hereinafter described. Access may be had to the compartment 7ª to permit the entrapped animals to pass therefrom, by means of a door 9, slidably mounted or otherwise supported upon the end wall 4, as shown in Fig. 1. In the side wall 2 there is an opening 10 controlled by a grating 11, the opening 10 serving to illuminate the compartment 7ª. In the end walls 4 and 5, openings or doorways 12 are formed, the same giving access to the runway 7. These doorways 12 are located close to the side wall 3, and consequently, when the side wall 3 is positioned adjacent the vertical wall of a room or apartment, animals traveling along the floor of the room or apartment and close to the vertical wall thereof may pass into the case 1 through either of the doorways 12. The case 1 includes fixed top sections 14 and a lid 15 which is hinged as shown at 16 to one of the fixed top sections. The lid 15 may be provided with a bail or handle 17 and is held closed by means of a hook 33 or any mechanical equivalent therefor. In the intermediate portion of the partition 6 there is a doorway 18, establishing a communication between the runway 7 and the compartment 7ª. A bait basket 19 extends between the partition 6 and the side wall 3, and is located above the doorway 18. The bait basket 19 is open at the top and when the lid 15 is raised, the bait may be placed in the bait basket. Leaders 20 are secured to the partition 6 upon opposite sides of the doorway 18 and extend into the compartment 7ª.

Staples 21 or the like are inserted into the upper edge of the doorway 18. A closure 22 for the doorway 18 is provided, and this closure 22 comprises, preferably, a single strip of material, bent zig-zag upon itself to form arms 23, the bends adjacent the upper corners of the closure being engaged, by twisting or otherwise, in the staples 21 to form a pivotal support for the closure 22. The resilient terminal arms 24 are bent to lie at an angle to the plane of the closure as will be understood best from Fig. 5, and these terminal arms 24 constitute latches, the functions of which will be made out hereinafter. Between certain of the arms 23 of the closure 22, counterweights 25 may be lodged. The several arms 23 of the closure may be connected by ties 26 which may be in the form of twisted wires. A stop plate 22$^a$ extends between the leaders 20. When an animal is entrapped in the compartment 7$^a$ it will be difficult for the animal to raise the closure 22, owing to the presence of the stop plate.

Rods 27 extend between the partition 6 and the side wall 3, these rods 27 constituting fulcrums for platforms 28. The inner ends of the platforms 28 are disposed close together and are located adjacent the doorway 18. Downward movement of the inner end of each platform 28 is limited by a stop pin 29 which projects inwardly from the side wall 3. If necessary or expedient, the platforms 28 may be counterweighted as indicated at 30. Rods 31 extend between the partition 6 and the side wall 3 adjacent the openings 12. These rods 31 form pivotal mountings for vertically moving barriers 32 which control the doorways 12. The outer ends of the platforms 28 are engaged beneath the barriers 32, as will be understood best when the left hand end of Fig. 2 is examined and, as the right hand end of Fig. 2 will show, the barriers 32 are adapted to close down on top of the outer ends of the platforms.

Strips or plates 34 extend between the lower portions of the doorways 12. The upper end of each plate 34 is carried inwardly to form a threshold 35 which also constitutes a housing for the lower end of the barrier 32. The lower end of the plate or strip 34 is carried inwardly as indicated at 36 to form a housing for the corresponding end of the platform 28.

In order to set the trap, the operation is as follows:—The lower end of the closure 22 is lifted, the closure swinging upon its pivotal mounting 21. In this manner, the lower ends of the latches 24 are swung inwardly. Then, the counterweighted outer ends of the platforms 28 will drop, as shown at the right hand end of Fig. 2, and the barriers 32 will swing backwardly into open positions. The inner ends of the platforms 28 thus will be disposed above the lower ends of the latches 24, the parts in question appearing as shown in Fig. 3 and as shown at the right hand end of Fig. 2. An animal entering the case 1 through either of the doorways 12, will depress the inner ends of both of the platforms 28, when the animal stands opposite to the doorway 18. When the inner ends of both of the platforms 28 are depressed, the inner ends of the platforms will engage beneath the lower ends of the latches 24, as shown in Figs. 6 and 7 the closure 22 tilting to permit this operation. When the inner ends of the platforms 28 are depressed, the outer ends of the platforms will be raised, and the closures or barriers 32 will be disposed as shown in Fig. 2 at the left hand end thereof. Thus, the animal is trapped in the runway 7. The animal in the runway, being attracted by the light proceeding through the opening 10, will pass into the compartment 7$^a$, beneath the closure 22, the closure being raised. In this manner, the latches 24 will be withdrawn from the inner ends of the platforms 28 and both platforms will assume the position shown at the right hand end of Fig. 2, the trap thus being set automatically. When the resilient arms 24 engage the edges of the platforms 28, as shown in Fig. 3, these arms 24 are under some tension, due to the presence of the weight 25 and the arms 24 are flexed slightly. Therefore, when either platform 28 is depressed, the corresponding arm will snap above the platform and hold the same depressed at its inner end, even though the other arm 24 may still be bearing against the edge of the other platform 28.

Having thus described the invention, what is claimed is:—

1. In a device of the class described, a case; barriers controlling egress from the case; platforms pivoted in the case and co-operating at their outer ends with the barriers to close the latter when the inner ends of the platforms are depressed; a door pivoted in the case and provided with resilient arms, the arms being flexed against the edges of the platforms by the weight of the door when the inner ends of the platforms are elevated, the arms being adapted to engage above the inner ends of the platforms when the inner ends of the platforms are depressed.

2. In a device of the class described, a case; a partition in the case and dividing the case into a runway and a compartment, the partition having a doorway; a barrier controlling the runway; a tiltable platform operatively connected with the barrier; a pivoted door for the doorway, the door comprising a strip of material formed into zig-zag outline to define intermediate and terminal arms, one terminal arm being disposed at an angle to the plane of the door to define a platform engaging latch; and a counterweight held between a pair of the intermediate arms of the doorway; and a tie connecting the intermediate arms.

In testimony that we claim the foregoing as our own, we have hereto affixed our signatures in the presence of two witnesses.

JOHN FORNEY DRAPER.
JOHN JACOB TAGLAUER.

Witnesses:
Dr. E. M. KNOX.
MACY KNOX.

Copies of this patent may be obtained for five cents each, by addressing the "Commissioner of Patents, Washington, D. C."